(12) United States Patent
Goto et al.

(10) Patent No.: US 8,070,343 B2
(45) Date of Patent: Dec. 6, 2011

(54) LIGHT PIPE PROVIDING WIDE ILLUMINATION ANGLE

(75) Inventors: Kazuhiro Goto, Markham (CA); Dragos Luca, Toronto (CA); Salvatore Alesio, Newmarket (CA)

(73) Assignee: Tyco Electronics Canada ULC, Markham (CA)

( * ) Notice: Subject to any disclaimer, the term of this patent is extended or adjusted under 35 U.S.C. 154(b) by 0 days.

(21) Appl. No.: 12/429,038

(22) Filed: Apr. 23, 2009

(65) Prior Publication Data

US 2009/0201697 A1    Aug. 13, 2009

Related U.S. Application Data

(63) Continuation of application No. 11/384,679, filed on Mar. 19, 2006, now Pat. No. 7,585,097.

(51) Int. Cl.
*F21V 7/04* (2006.01)
(52) U.S. Cl. ........ 362/560; 362/297; 362/299; 362/340; 362/511; 362/608; 385/4; 385/31; 385/132; 385/146
(58) Field of Classification Search ............ 362/96, 362/101, 297, 299, 301, 336, 340, 343, 410, 362/511, 555, 608, 612, 487–490, 493, 560; 385/4, 31, 132, 146
See application file for complete search history.

(56) References Cited

U.S. PATENT DOCUMENTS

| | | | |
|---|---|---|---|
| 4,422,719 A * | 12/1983 | Orcutt | 385/123 |
| 5,359,691 A | 10/1994 | Tai et al. | |
| 5,550,657 A * | 8/1996 | Tanaka et al. | 349/62 |
| 5,810,463 A | 9/1998 | Kawahara et al. | |
| 5,845,037 A | 12/1998 | Miekis | |
| 6,031,958 A * | 2/2000 | McGaffigan | 385/146 |
| 6,206,534 B1 | 3/2001 | Jenkins et al. | |
| 6,285,814 B1 * | 9/2001 | Pojar | 385/133 |
| 6,612,729 B1 | 9/2003 | Hoffman | |
| 6,783,269 B2 | 8/2004 | Pashley et al. | |
| 6,880,945 B2 | 4/2005 | Knaack et al. | |
| 6,883,949 B2 | 4/2005 | Goto et al. | |

(Continued)

FOREIGN PATENT DOCUMENTS

DE        100 32 927        1/2002

OTHER PUBLICATIONS

European Search Report, Mail Date Mar. 21, 2011, EP 11 15 1083, Application No. 11151083.0-1524 / 2302426.

*Primary Examiner* — Diane Lee
*Assistant Examiner* — Mary Zettl (57) ABSTRACT

A light pipe is configured to provide a wide effective angle of illumination while simultaneously providing a substantially uniform distribution of light along a length of the light pipe. One or more reflective surfaces not aligned with an inner surface are disposed such that when at least one reflective surface is illuminated, light is emitted from the light pipe at one or more specified angles of light emission. A plurality of reflection points are formed on the inner surface to cause the specified angles when at least one of the reflective surfaces is illuminated. A light pipe is also provided having one or more exterior protrusions configured to function as a secondary light source. A second portion of an outer surface of the light pipe has a radius of curvature which differs from the radius of curvature of the first portion of the outer surface.

15 Claims, 7 Drawing Sheets

U.S. PATENT DOCUMENTS

| | | |
|---|---|---|
| 7,273,300 B2 * | 9/2007 | Mrakovich ............... 362/249.01 |
| 7,350,952 B2 | 4/2008 | Nishigaki |
| 2002/0114168 A1 | 8/2002 | Pelka et al. |
| 2002/0141201 A1 | 10/2002 | Shimura et al. |
| 2003/0034445 A1 | 2/2003 | Boyd et al. |
| 2003/0156431 A1 | 8/2003 | Gozum et al. |
| 2004/0052089 A1 | 3/2004 | Goto et al. |
| 2004/0066654 A1 * | 4/2004 | Jacob et al. ................... 362/293 |
| 2004/0080938 A1 | 4/2004 | Holman et al. |
| 2004/0252522 A1 | 12/2004 | Wu |

* cited by examiner

LIGHT PIPE PROVIDING WIDE ILLUMINATION ANGLE

RELATED APPLICATION

The present application is a Continuation of and claims priority from U.S. application Ser. No. 11/384,679 filed Mar. 19, 2006, titled "LIGHT PIPE PROVIDING WIDE ILLUMINATION ANGLE", the complete subject matter of which is hereby expressly incorporated by reference in its entirety.

TECHNICAL FIELD

The present disclosure relates to light pipes and illumination angles of light emitted therefrom.

BACKGROUND

Light pipes are typically cylindrical, transparent structures through which light is channeled longitudinally by total internal reflection. Total internal reflection occurs when light is transmitted at a critical angle from one medium to another medium with a lower index of refraction. At the critical angle, light is reflected back into the medium of higher refractive index instead of being refracted by the change in media and traveling through the second medium. All or some of light transmitted through a light pipe may undergo total internal reflection. Light not internally reflected is emitted from the light pipe along the length of the light pipe.

Light pipes transmit light generated by a light source. The light source is usually contained in a lamp assembly to which the light pipe is fastened. A typical lamp assembly includes a housing that contains a light source such as a light emitting diode (LED), necessary electrical components to supply power to the light source, and a means for fastening the light pipe to the lamp assembly.

In many light pipe applications the space to accommodate the light pipe and associated lamp assembly is limited. Interior automobile lighting is an example of such an application. It is also desirable to maximize the light pipe output. Efforts to maximize output are typically directed to minimizing light degradation along the length of the pipe.

Some light pipes provide relatively even light distribution along the length of the light pipe, the projection angle of the light emitted from the light pipe is somewhat limited. In some applications, it is necessary to provide a wider distribution of the light emanating from the light pipe. In current applications, the angle of light projection may be increased by widening the reflective strip but a comparatively large increase in strip width is necessary to cause a significant difference in the projection angle. However, a large increase in the width of the reflective strip results in excessive light degradation along the length of the light pipe. Consequently, there is a need for a light pipe that provides a wide angle of light emitted from the light pipe and minimizes degradation of the illumination along the length of the pipe.

Along with increased light emissions from a light pipe via a wider angle of light emitting from the light pipe, some applications require additional characteristics of the light emitting from the light pipe. One particular need is for a light pipe that provides softer edges of the light emitting from a light pipe. In this application, the light emitted from the light pipe would not show a visibly distinct angle where the light is projecting from the light pipe. This may be required for specific "mood" lighting.

SUMMARY

An embodiment of the present disclosure relates to a light pipe configured to provide a wide effective angle of illumination while simultaneously providing a uniform distribution of light along a length of the light pipe. The light pipe may have an outer surface and an interior region bounded by an inner surface interfacing with the outer surface which includes one or more reflective surfaces not aligned with the inner surface disposed such that when at least one of the one or more reflective surfaces is illuminated, light is emitted from the light pipe at one or more specified angles. A plurality of reflection points may be formed on the inner surface to cause the one or more specified angles of light emission when at least one of the one or more reflective surfaces is illuminated. When at least one of the one or more reflective surfaces is illuminated, the at least one of the one or more reflective surfaces may create a secondary light source. The light pipe may further include at least one interior protrusion disposed in the interior region and one or more of the reflective surfaces may be disposed on the at least one interior protrusion.

Alternatively, the light pipe may include at least one channel disposed in the interior region, the channel forming at least one exposed surface in the interior region, and wherein the one or more reflective surfaces is disposed on the at least one exposed surface in the interior region.

In another exemplary embodiment, the light pipe may have an outer surface and an interior region bounded by an inner surface interfacing with the outer surface including one or more reflective surfaces aligned with the inner surface and disposed such that when at least one of the one or more reflective surfaces is illuminated, light is emitted from the light pipe at one or more specified angles of light emission. The outer surface may have a first portion and at least a second portion thereof. The one or more of the reflective surfaces may function as a secondary light source, and the at least second portion may have a radius of curvature which differs from the radius of curvature of the first portion of the outer surface. The radius of curvature of the at least a second portion is greater than the radius of curvature of the first portion of the outer surface. The outer surface may include at least a third portion having a radius of curvature which differs from the radius of curvature of the at least a second portion and from the radius of curvature of the first portion of the outer surface. The radius of curvature of the at least a third portion of the outer surface is greater than the radius of curvature of the at least a second portion.

BRIEF DESCRIPTION OF THE DRAWINGS

The present disclosure is best understood from the following detailed description when read with the accompanying drawings.

DETAILED DESCRIPTION

Figure 1:
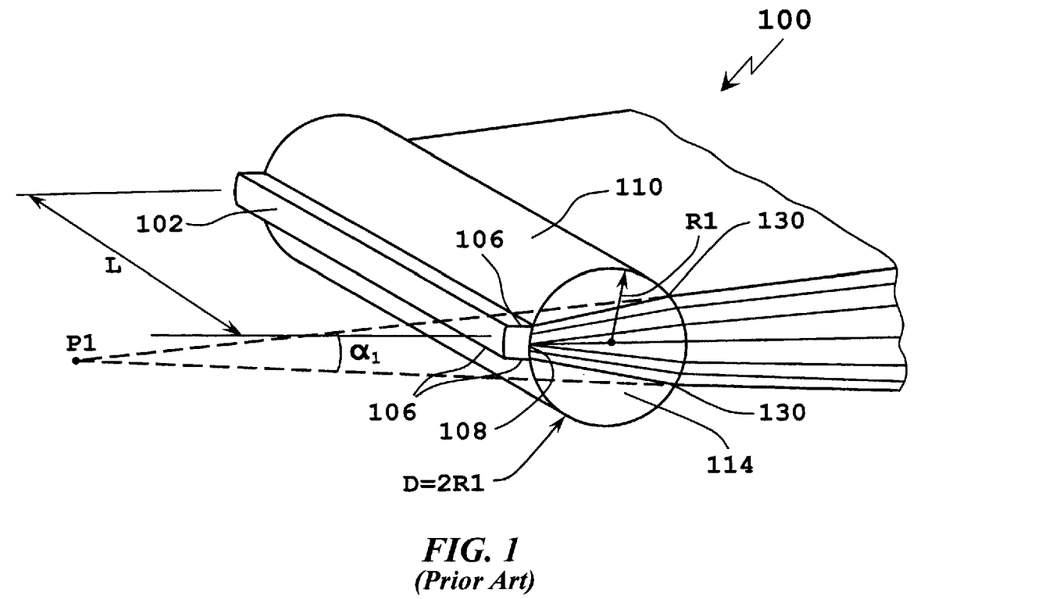
FIG. 1 is a top perspective view of a light pipe having a reflective strip according to the prior art.
Figure 2:
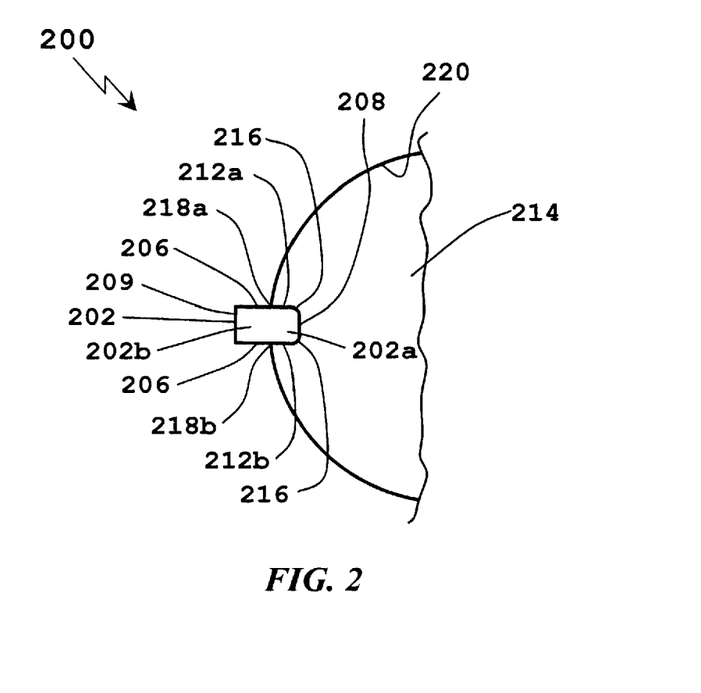
FIG. 2 is a partial end elevation view of a light pipe having one or more reflective surfaces according to an illustrative embodiment of the present disclosure.

Referring to FIG. 1, light pipe 100 is used in conjunction with a light source that radiates light that is transmitted through the light pipe. (As used herein "light source" includes one or more individual sources. For example, a light source may be a single light emitting diode or included a plurality of light emitting diodes. A single light source may include more than one type of light generating component.) A secondary light source, such as a reflective strip (108) reflects and emits light from the primary light source. The reflective strip may be incorporated in an exterior protrusion that may also be used to align the light pipe with a lamp assembly or with the object to which it is mounted.

"Light pipe section" as used herein refers to a portion of a light pipe which transmits the light and wherein a reflective strip may be located to reflect and emit light from the light pipe.

A light pipe is generally cylindrical or may have any shape compatible with the use and operation of the light pipe. For example, a light pipe may have an oval, elliptical, or the like, cross-section. A light pipe section can be comprised of clear acrylic or any material that allows transmission of light therethrough. Light pipe materials are typically non-yellowing and durable. A current advantage of acrylic is that it is a cost effective material and provides optimal performance. Polycarbonate is another example of a typical light pipe material, however, it can be prone to discoloration and have a lower light transmission than acrylic.

A light pipe can be manufactured by extrusion; however, other suitable manufacturing techniques can be employed as well where desired. For example, it is possible to have a separate component having a reflective surface fastened to a light pipe. The reflective surface may also be co-extruded with the light pipe.

In an embodiment of the prior art, FIG. 1 depicts a light pipe 100 having an exterior protrusion which functions as an alignment component according to the prior art. Such an embodiment of the prior art is described in commonly owned U.S. Pat. No. 6,883,949 B2, by Goto et al., entitled "APPARATUS, METHOD AND ARTICLE OF MANUFACTURE FOR A LIGHT PIPE AND LAMP ASSEMBLY," issued Apr. 26, 2005, the entire contents of which are incorporated by reference herein. More particularly, light pipe 100 through which light is transmitted, includes exterior protrusion 102. The light pipe has an outer surface 110 and an interior region 114.

The exterior protrusion 102 includes a reflective surface 108. Color or reflective quality may, where desired, be incorporated into the exterior protrusion material or be applied to the exterior protrusion. The entire protrusion 102 may be reflective or the protrusion 102 may only have one or more reflective surfaces 108 or portions. The material and color of the exterior protrusion 102 may be selected to provide a high level of light reflection and scattering. In the embodiment shown, the interface between the light pipe 100 and the exterior protrusion 102 is reflective toward the light pipe 100. In another embodiment, a mating surface of a substantially clear exterior protrusion may have a reflective coating that reflects light toward a light pipe.

The exterior protrusion 102 having reflective surface 108 may extend the length "L" of the light pipe, or may occupy one or more portions of the length of the light pipe. One or more embedded reflective strips (or other shaped reflective components) may be used.

The degree of reflection provided by a reflective strip is a function of the length and width of the strip. In general, the greater the surface area of the strip facing the remainder of the light pipe, the greater the amount of reflection and scattering.

The width of a protrusion surface from which light is reflected or scattered also affects the amount of light reaching the distal end of the light pipe (i.e. the end furthest from the primary light source). The width of the reflection surface is the width along the light pipe. Light travels along the light pipe because of total internal reflection. A reflective or scattering surface interferes with the total internal reflection, thereby causing light to be emitted before reaching the end of the light pipe. If the surface is too wide, a greater amount of light is emitted from the light pipe portion closest to the primary light source causing light degradation along the light pipe. This reduces the amount of light emitted from the distal end of the light pipe and creates an inconsistent emission along the pipe. Thus, the width of the reflective strip is usually a function of the length "L" of the light pipe 100. The shorter the pipe, the wider the reflective strip can be without adversely affecting the amount of light emitted from the distal end of the light pipe. In most applications, the width of the reflective surface is less than a distance extending 180° (180 degrees) around the light pipe section. In this context, the width of the reflective surface actually is intended to represent the total surface area of the reflective surface but the reflectivity of, or light transmission from, the reflective surface varies depending upon the specific orientation of particular portions of the reflective surface. Beyond the particular width specified, limited light would exit the light pipe. The efficiency is unreasonably low, because a large amount of light energy may be lost due to excessive reflection within the light pipe.

The diameter "D" (which is equal to twice the radius "R1", i.e., "D=2R1") or other cross-sectional dimensions of the light pipe for non-circular cross-sections are dependant on the light pipe's application. In exemplary embodiments, interior applications may utilize 5 mm diameter light pipes and exterior applications may utilize 9 to 10 mm diameter light pipes, although, as should be understood, other diameters can be used where desired.

As illustrated in FIG. 1, when the reflective surface 108 is illuminated as a secondary light source, the configuration of the reflective surface 108 results in a light path through the interior region 114 which refracts at the outer surface 110, e.g., at the region of the outer surface 110 between the surface designations 130, resulting in an effective angle of illumination "α1".

Turning now to one embodiment of the present disclosure, there is illustrated in FIGS. 2-5 a light pipe 200 with an outer surface 210 and an interior region 214 bounded by an inner surface 220. The inner surface 220 interfaces with the outer surface 210. The light pipe 200 includes one or more protrusions 202 and at least one of the one or more protrusions 202 is configured with an interior portion 202a protruding internally into the interior region 214 of the light pipe 200, and away from the outer surface 210, such that at least one of the one or more surfaces on protrusion 202 functions as a secondary light source. The protrusion 202 may include an exterior portion 202b protruding away from the outer surface 210. Although the exemplary embodiment illustrates exterior portion 202b, one skilled in the art will recognize that alternative configurations of the protrusion 202 are possible and become known by the disclosure herein. The embodiments are not limited in this context. The outer surface 210 extends from first boundary line 218a to second boundary line 218b. The boundary lines 218a and 218b generally define the transition from the interior portion 202a to the exterior portion 202b.

Figure 3:
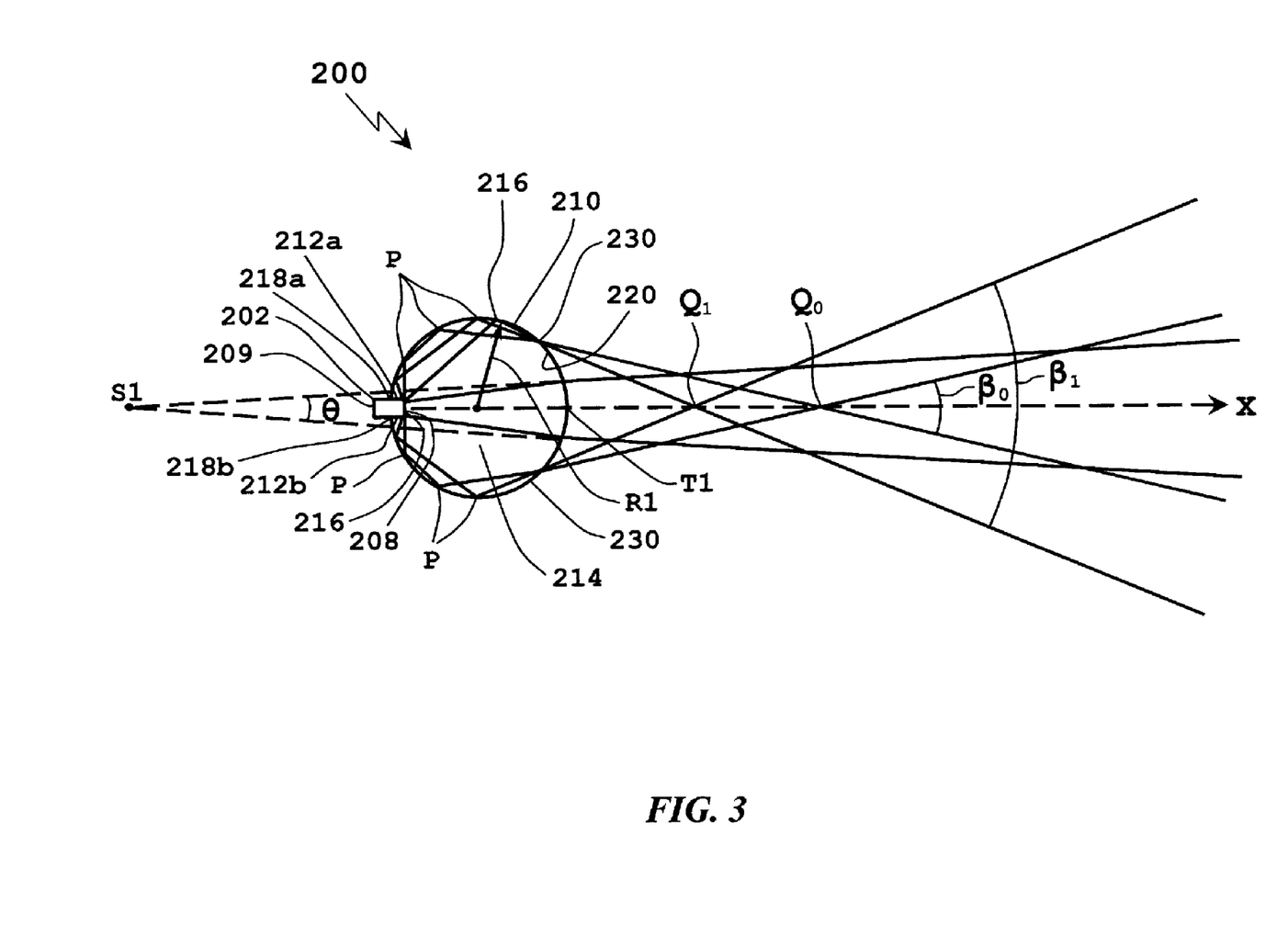
FIG. 3 is an end elevation view of the light pipe of FIG. 2 having reflective surfaces according to an illustrative embodiment of the present disclosure showing a representation of the angle of light emitted from the light pipe.
Figure 4:
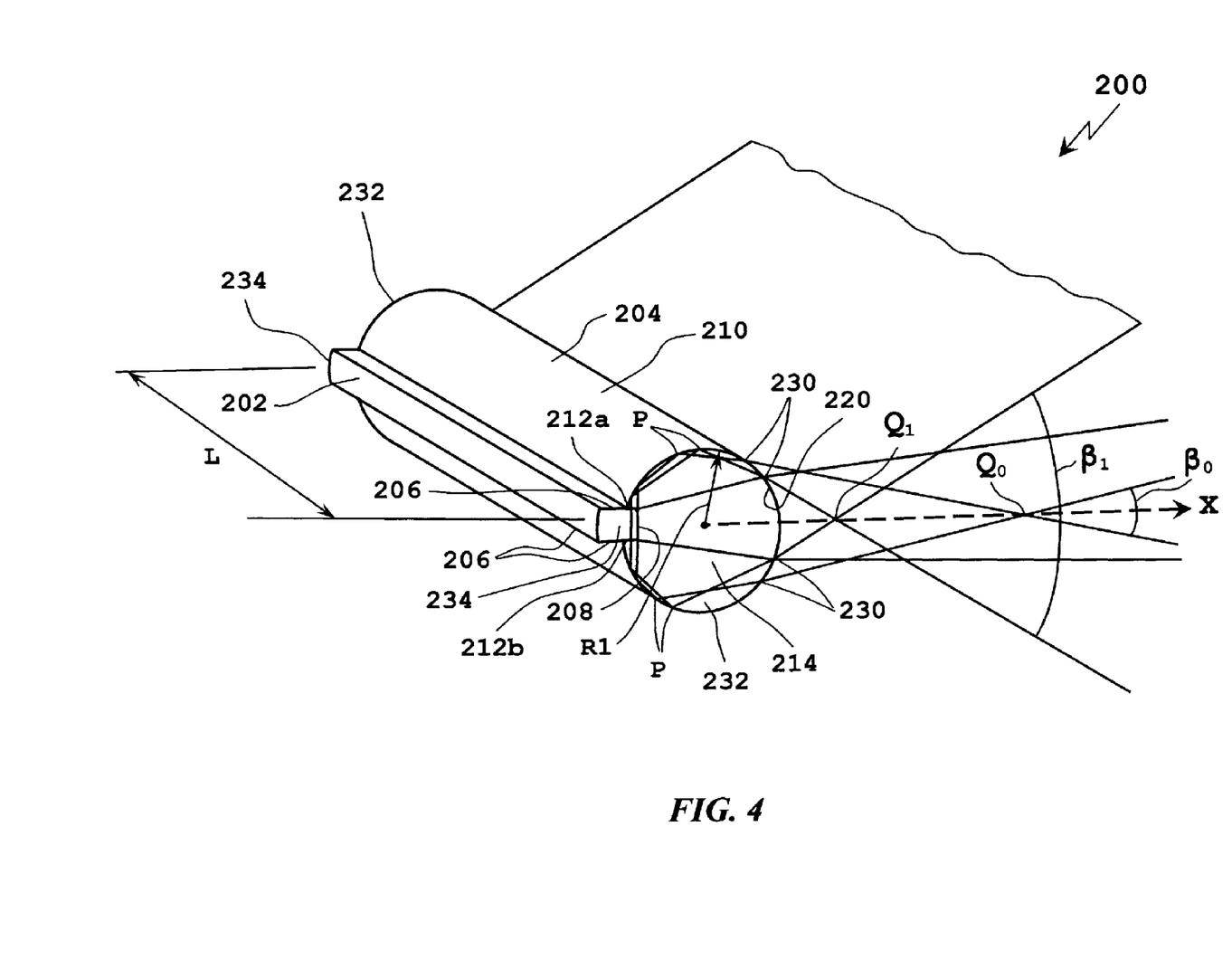
FIG. 4 is a top perspective view of the light pipe of FIG. 3 having reflective surfaces according to an illustrative embodiment of the present disclosure.

At least one of the protrusions 202 includes a primary reflective surface 208 on the interior portion 202a which is not aligned with the inner surface 200 and so configured in the interior region 214 such that the primary reflective surface 208 is generally orthogonal to the direction of light output, as shown by the arrow "X" in FIGS. 3 and 4, of the light pipe 200 when at least one protrusion 202 is illuminated. More particularly, the primary reflective surface 208 is disposed on the interior portion 202a at the maximum distance "D–A" of protrusion of the interior portion 202a into the interior region 214 (see FIG. 5). The primary reflective surface 208 may be flat or slightly convex. The protrusion 202 may have a rear surface 209 on the exterior portion 202b.

The interior portion 202a of the protrusion 202 further includes at least one secondary reflective surface, with two opposing secondary reflective surfaces 212a and 212b illustrated in FIGS. 2-5 by way of example, configured in the interior region 214 such that at least one secondary reflective surface 212a and/or 212b is generally or substantially orthogonal to the primary reflective surface 208.

Alternatively, the protrusion 202 includes at least one secondary surface, e.g., 212a and/or 212b, not aligned with the inner surface 220 and so configured in the interior region 214 such that when the protrusion 202 is illuminated, light is emitted from the secondary surface such as 212a and/or 212b in the direction generally orthogonal to the direction of the light output of the light pipe 200, as shown by the arrow "X" in FIGS. 3 and 4.

The light pipe 200 may be illuminated by illumination emitted from a lamp (not shown) at either one of ends 232 of the light pipe 200 and which passes at least partially directly through at least one of ends 234 of the protrusion 202 along the length "L" of the light pipe 200. The light passing longitudinally through the protrusion 202 impinges on the reflective surfaces 208 and 212a, 212b and is reflected substantially orthogonally therefrom by scattering as described in more detail below. When one or more of the reflective surfaces 208 and 212a and/or 212b are illuminated, a secondary light source is created.

The primary and secondary reflective surfaces 208 and 212a, 212b, respectively, may be white in color. The protrusion 202 may be manufactured by co-extruding a colored material onto the clear material of the light pipe 200. As illustrated in FIG. 4, for some applications, it may be desired for the protrusion 202 to extend at least partially, if not entirely, along a length "L" of the light pipe 200.

Figure 5:
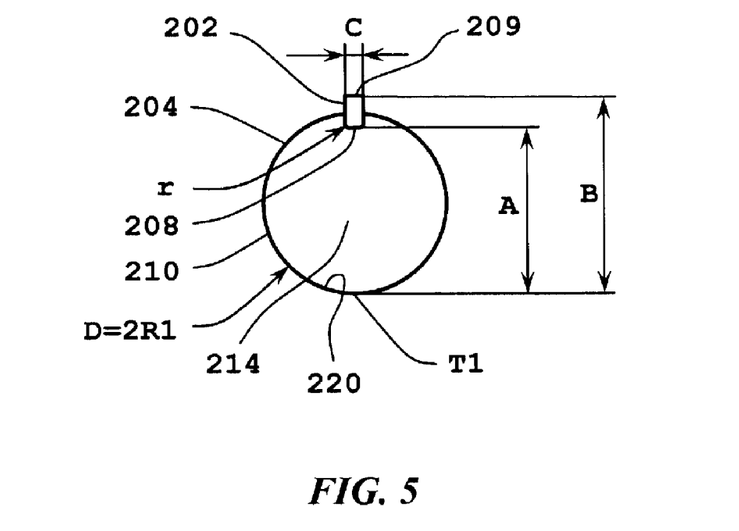
FIG. 5 is another end view of the light pipe of FIG. 2 having reflective surfaces according to an illustrative embodiment of the present disclosure and showing dimensional parameters.

As shown in FIG. 5, the light pipe 200 may be substantially cylindrical with a diameter "D" equal to twice the radius "R1", i.e., D=2 R1. The protrusion 202 may be disposed in the interior region 214 such that the primary reflective surface 208 is diametrically opposite a point "T1" on the surface 210 of the light pipe 200. A dimension "A" is defined by the distance from the point "T1" to the primary reflective surface 208. A dimension "B" is defined by the distance from the point "T1" to the rear surface 209 of the protrusion 202. A dimension "C" is defined by the thickness of the protrusion 202 which is the distance between the secondary surfaces 212a and 212b or between the boundary lines 218a and 218b. The interior portion 202a of the protrusion may have corner regions 216 formed by the intersection of the primary reflective surface 208 with the secondary reflective surfaces 212a and 212b. The corner regions 216 may have a radius of curvature "r".

In one embodiment, the diameter "D" ranges up to about 10 mm (millimeters). The dimension "A" may range up to about 9.2 mm. The dimension "B" may range up to about 11.0 mm. The dimension "C" or thickness may range up to about 1.0 mm. The radius of curvature "r" may range up to about 0.2 mm. Therefore, the interior portion 207a protrudes internally into the interior region 214 of the light pipe 200 by about at least 0.8 mm, as given by the difference between "D" and "A".

As illustrated in FIG. 3, the light emitted from the primary reflective surface 208 in the direction of the arrow "X" refracts at the surface 210 of the light pipe 200, e.g., at the region of the outer surface 210 between the surface designations 230, so as to be generally orthogonal to the direction of the light output of the light pipe 200, and forms an effective focal point "S1" at a distance behind the rear surface 209 of the protrusion 202 and resulting in an effective angle of illumination "θ" from the primary reflective surface 208. However, due to the emission of light from the secondary surface such as 212a and/or 212b in the direction generally orthogonal to the direction of the light output of the light pipe 200, as shown by the arrow "X" in FIGS. 3 and 4, additional light is reflected internally at refraction points "p" along the inner surface 220 so that light is transmitted in the direction away from the outer surface 210 of light pipe 200 to form an effective angle of illumination ranging from a minimum effective angle of illumination "$\beta_0$" with respect to a first focal point "$Q_0$" away from the outer surface 210, to a maximum effective angle of illumination "$\beta_1$" with respect to a second focal point "$Q_1$" away from the outer surface 210. The distance of the first focal point "$Q_0$" away from the point "T1" on the surface 210 is greater than the distance of the second focal point "$Q_1$" away from the point "T1". Therefore, when at least one of the one or more reflective surfaces 208 and 212a and/or 212b is illuminated, light is emitted from the light pipe 200 at specified angles of illumination or of light emission "θ", "$\beta_0$", and "$\beta_1$".

Both the minimum effective angle of illumination "$\beta_0$" and the maximum effective angle of illumination "$\beta_1$" from the secondary reflective surfaces 212a and 212b are greater than the effective angle of illumination "θ" from the primary reflective surface 208. Both the minimum effective angle of illumination "$\beta_0$" and the maximum effective angle of illumination "$\beta_1$" from the secondary reflective surfaces 212a and 212b are greater than the effective angle of illumination "α1" available from the prior art without the internal protrusion 202a (see FIG. 1) The result is a widening of the effective angle of illumination "$\beta_1$" of the light pipe 200 as compared to the effective angle of illumination "α1".

Due to the fact that the secondary reflective surfaces 212a and 212b are not facing the main passage of the light traveling along the length "L" of the light pipe 200 (see FIG. 4), the intensity of light impinging on the secondary surfaces 212a and 212b is less than the intensity of light impinging on the primary surface 208. As a result, the reflected light emitted from the secondary surfaces 212a and 212b is at a reduced intensity as compared to the intensity of light emitted from the primary reflective surface 208. Without the secondary surfaces 212a and 212b, the light emitted from the light pipe 200 would tend to have a sharp cut-off line, which in some cases may be objectionable. The reduced intensity of light emitted from the secondary surfaces 212a and 212b reduces the sharp contrast, providing a more gradual transition between the lit area and unlit area, resulting in a more pleasing effect for many applications.

In view of the foregoing, it can be appreciated that the light pipe 200 includes an outer surface 210 and an interior region 214 bounded by an inner surface 220 interfacing with the outer surface 210. The light pipe 200 is configured with one or more reflective surfaces, e.g., primary reflective surface 208 and secondary reflective surfaces 212a, 212b, any one of which may be disposed such that when at least one of the one or more reflective surfaces 208 or 212a, 212b is illuminated, a plurality of refraction points "p" are formed on the inner surface 220 causing a plurality of focal points, e.g., focal points "$Q_0$" and "$Q_1$" of light outside of the outer surface 210 of the light pipe 200. In addition, the light pipe 200 is configured to provide a wide effective angle of illumination "$\beta_1$" while simultaneously providing a substantially uniform distribution of light along the length "L" of the light pipe 200.

Figure 6:
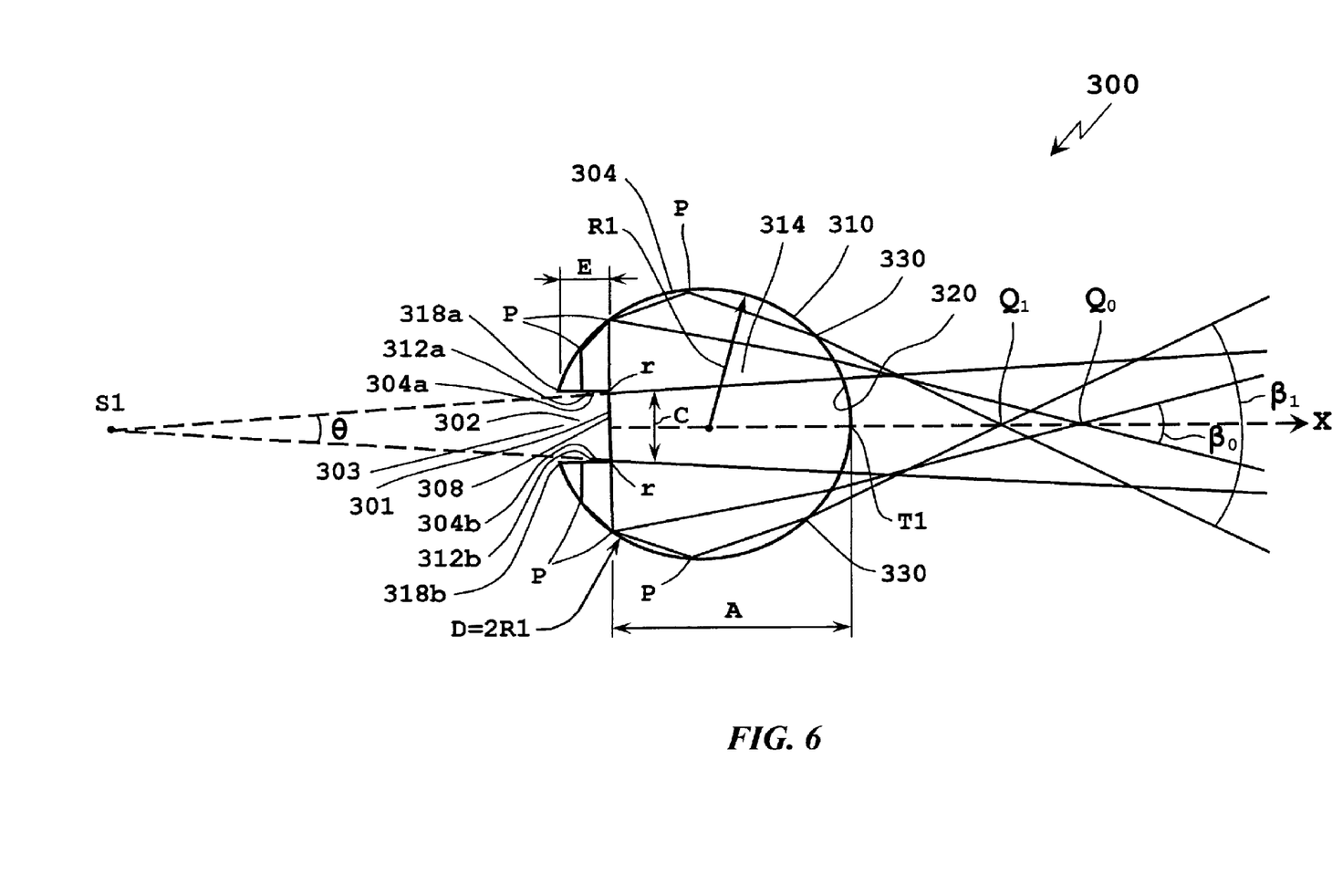
FIG. 6 is an end elevation view of a light pipe having a channel according to another illustrative embodiment of the present disclosure.
Figure 7:
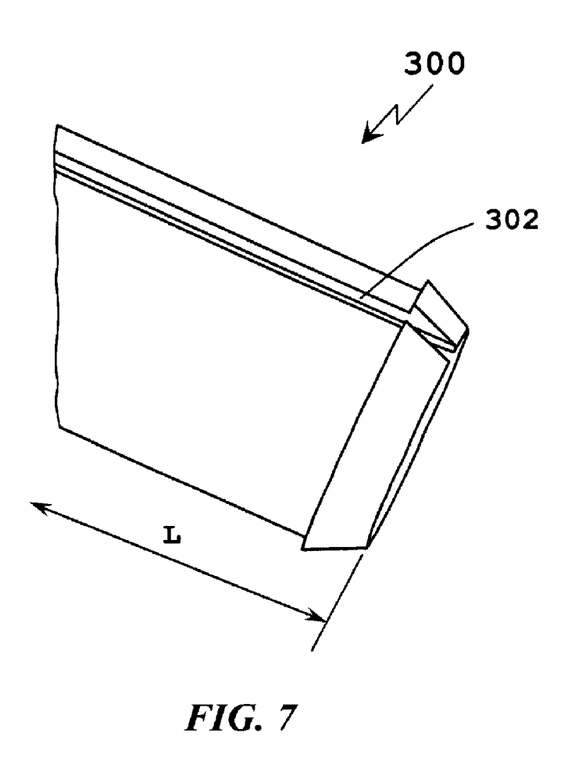
FIG. 7 is a perspective view of the light pipe having a channel of FIG. 6 according to an illustrative embodiment of the present disclosure.

Referring now to FIGS. 6-7, there is shown another illustrative embodiment of a light pipe also configured to provide a plurality of focal points of light outside of an outer surface of a light pipe section. More particularly, light pipe 300 is substantially identical to light pipe 200 except that instead of protrusion 202, light pipe 300 includes an inner surface 320 and at least one of one or more reflective surfaces, e.g., primary reflective surface 308 and secondary reflective surfaces 312a, 312b, disposed in at least one channel 302 formed in interior region 314 of the light pipe 300, and having an open region or aperture 303 at outer surface 310. The inner surface 310 bounds the interior region 314 and interfaces with the outer surface 310. The channel 302 is configured to protrude internally into the interior region 314 of the light pipe 300 and forms at least one exposed surface, e.g., exposed surface 301 on which the primary reflective surface 308 is disposed and exposed surfaces 304a and 304b, which are substantially orthogonal to exposed surface 301, and on which secondary reflective surfaces 312a and 312b are disposed, respectively. The reflective surfaces 308 and 312a and/or 312b are not aligned with the inner surface 320. The outer surface 310 extends from first boundary line 318a to second boundary line 318b. The boundary lines 318a and 318b generally define the limits of the aperture 303.

The primary reflective surface 308 may be configured in the interior region 314 so that the primary reflective surface 308 is generally orthogonal to the direction of light output of the light pipe 300, as again shown by the arrow "X" in FIG. 6, when the primary reflective surface 308 is illuminated.

Also, the two opposing secondary reflective surfaces 312a and 312b, illustrated in FIG. 6 by way of example, may be configured in the interior region 314 such that at least one secondary reflective surface 312a and/or 312b is generally orthogonal to the primary reflective surface 308.

Alternatively, the secondary surfaces, e.g., 312a and/or 312b, may be configured in the interior region 314 so that when the secondary surface 312a and/or 312b are/is illuminated, light is emitted from the secondary surface such as 312a and/or 312b in the direction generally orthogonal to the direction of the light output of the light pipe 300, as shown by the arrow "X" in FIG. 6.

The primary and secondary reflective surfaces 308 and 312a, 312b, respectively, may be white in color. Other colors may be utilized depending upon the lighting effects desired. Paint utilized for coloring should be suitable for the application, e.g., the paint should be chemically compatible with the light pipe 300, be sufficiently color fast, have sufficient adhesive properties, and have sufficient ultraviolet (UV) resistance. The embodiments are not limited in this context.

As illustrated in FIG. 7, depending upon the application, the channel 302 may extend at least partially, if not entirely, along length "L" of the light pipe 300. As shown in FIG. 6, the light pipe 300 may be substantially cylindrical with a diameter "D" equal to twice the radius "R1", i.e., D=2 R1. The particular dimensions of light pipe 300 are essentially identical to the particular dimensions of the light pipe 200 described previously with the exception of the dimension "B" which is not applicable. The channel 302 has a width defined by dimension "C" and a depth protruding into the interior region 314 as defined by dimension "E". The dimension "E" is slightly less than the difference of "D" minus "A".

Again, both the minimum effective angle of illumination "$\beta_0$" and the maximum effective angle of illumination "$\beta_1$" from the secondary reflective surfaces 312a and 312b are greater than the effective angle of illumination "θ" from the primary reflective surface 308. In turn, the effective angle of illumination "θ" from the primary reflective surface 308 is greater than the effective angle of illumination "α1" from the exterior protrusion 102 of the prior art (see FIG. 1). The result is a widening of the each of the effective angles of illumination "θ", "$\beta_0$", and "$\beta_1$" of the light pipe 300 as compared to the effective angle of illumination "α1". In addition, the light pipe 300 is configured to provide a wide effective angle of illumination "$\beta_1$" while simultaneously providing a substantially uniform distribution of light along the length "L" of the light pipe 300.

Returning now to the light pipe 100 of FIG. 1 having a reflective strip 102 according to the prior art, the light pipe 100 has a substantially cylindrical cross-section. Therefore, the light pipe 100 has a single radius of curvature "R1". As described previously, when the reflective surface 108 is illuminated as a secondary light source, the configuration of the exterior protrusion 102 with respect to the light pipe 100 results in a light path through the interior region 114 which refracts at the outer surface 110 to form an effective focal point "P1" away from the exterior protrusion 102, resulting in an effective angle of illumination "α1" formed by the light pattern from the reflective surface 108.

Figure 8:
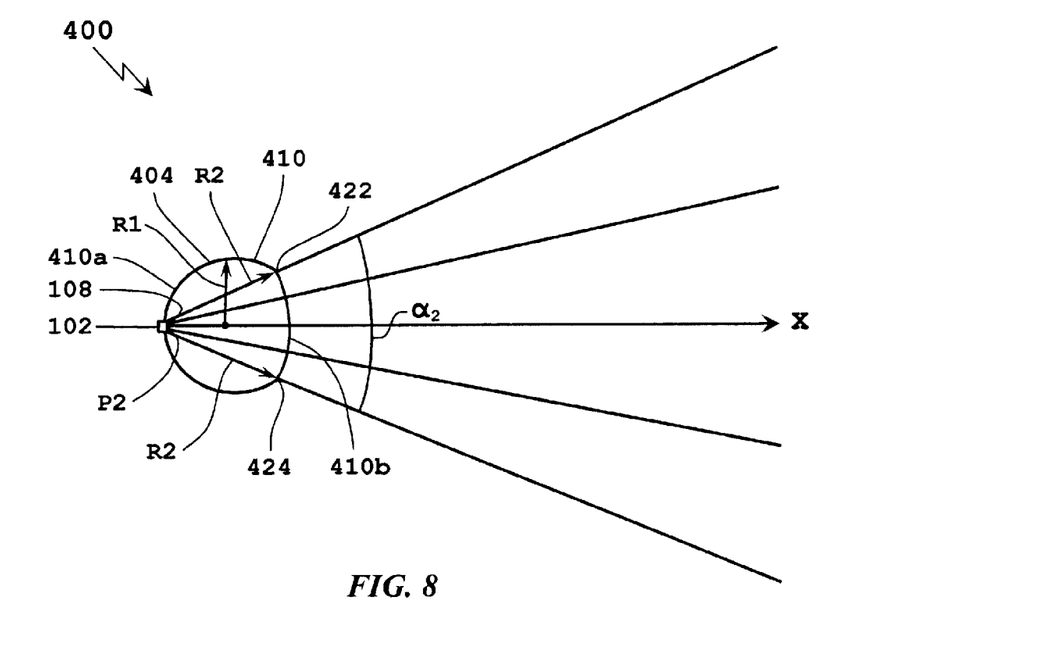
FIG. 8 is an end elevation view of a light pipe having a cross-sectional shape with more than one radius of curvature according to another illustrative embodiment of the present disclosure.

FIG. 8 discloses another illustrative embodiment of the present disclosure of a light pipe having an outer surface with more than one radius of curvature. More particularly, light pipe 400 includes one or more exterior protrusions, e.g., exterior protrusion 102 with the generally arcuate surface 108 as the primary reflective surface disposed on outer surface 410. Although surface 108 is described as generally arcuate, e.g., convex or concave, surface 108 may also be substantially flat.

The light pipe 400 also includes an interior region 414 which is bounded by an inner surface 420. The inner surface 420 interfaces with the outer surface 410. The outer surface 410 includes a first portion 410a, which may extend counter-clockwise from a first position 422 to a second position 424, and at least a second portion 410b, which may extend counterclockwise from the second position 424 back to the first position 422. The exterior protrusion 102 is configured on the first outer surface portion 410a to protrude externally away from the outer surface 410 such that reflective surface 108 functions as a secondary light source. More particularly, the reflective surface 108 is aligned with the inner surface 410. Those skilled in the art will recognize that the first and second portions 410a and 410b, respectively, are described with respect to the counterclockwise direction only for convenience and that reference to the clockwise direction is equally applicable.

Although the light pipe 400 has a generally circular cross-section, the second portion 410b has a radius of curvature "R2" which differs from the radius of curvature "R1" of the first portion 410a of the outer surface 410, and the light emitted from the reflective surface 108 is generally orthogonal to the general direction of light output of the light pipe 400, as again shown by the arrow "X" in FIG. 8, when the primary reflective surface 108 is illuminated, and passes substantially through the second portion 410b having the radius of curvature "R2". The radius of curvature "R2" is greater than the radius of curvature of the first portion "R1".

In relation thereto, the outer surface 410 is configured such that when the reflective surface 108 functions as a secondary light source to direct light in the generally first direction, as again shown by the arrow "X", the light pipe cross-section is substantially symmetrical with respect to the generally first direction "X".

Alternatively, when reflective surface 108 functions as a light source to direct light in the generally first direction "X", a light pattern is emitted from the light pipe 400 which is substantially symmetrical with respect to the generally first direction "X".

The light pattern so emitted from the light pipe 400 results in an effective focal point "P2" occurring substantially at the reflective surface 108 and an effective angle of illumination "α2" formed by the light pattern from the reflective surface 108 of exterior protrusion 102 is greater than the effective angle of illumination or light emission "α1" of the light pipe 100. The angle of illumination or light emission "α2" is dependent upon the radius of curvature "R2". The angles of illumination or light emission "α1" and "α2" are specified angles of light emission. When the one or more reflective surfaces 108 are illuminated, light is emitted from the light pipe 400 at one or more specified angles, e.g., angle of illumination or light emission "α2".

In some applications, it may be desired for the reflective surface 108 to extend at least partially along the length of the light pipe 400 (see dimension "L" in FIG. 4). In addition, the first portion 410a and the second portion 410b of the outer surface 410 may extend at least partially along the length of the light pipe 400 (see dimension "L" in FIG. 4). Additionally, the light pipe 400 is configured to provide a wide effective angle of illumination "α2" while simultaneously providing a substantially uniform distribution of light along the length "L" of the light pipe 400. Again, the reflective surface 108 of the protrusion 102 may be white in color.

Figure 9:
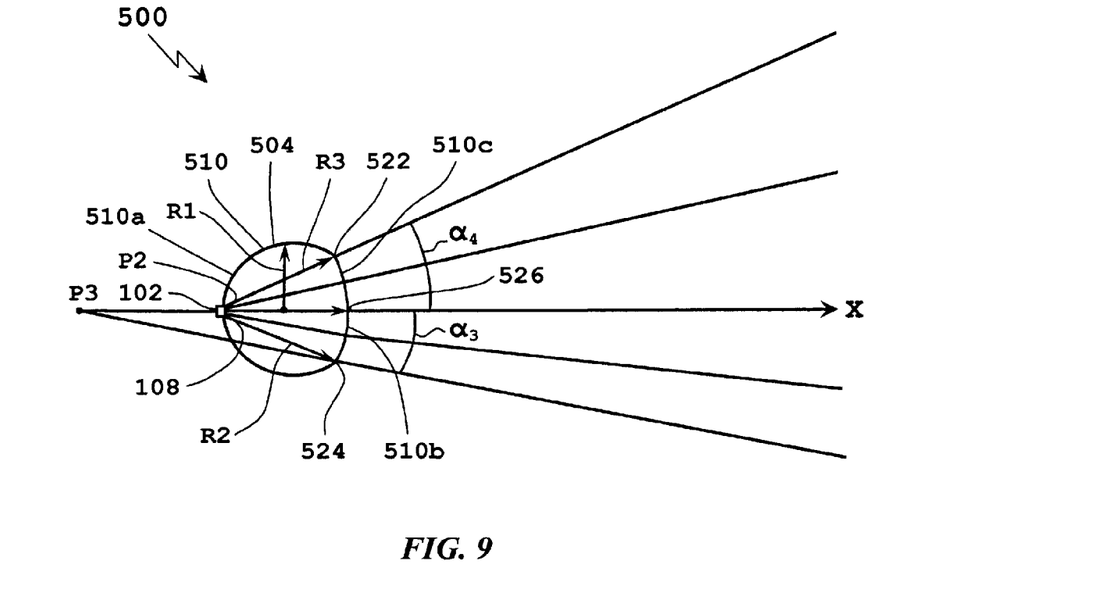
FIG. 9 is an end elevation view of a light pipe having a cross-sectional shape with more than one radius of curvature according to another illustrative embodiment of the present disclosure.

FIG. 9 discloses another illustrative embodiment of the present disclosure of a light pipe having an outer surface with yet another radius of curvature. More particularly, light pipe 500 is similar to light pipe 400 except that light pipe 500 includes an outer surface 510 having a first portion 510a, and at least a second portion 510b and a third portion 510c. The light pipe 500 also includes an interior region 514 which is bounded by an inner surface 520. The inner surface 520 interfaces with the outer surface 510. The first portion 510a may extend counterclockwise from first position 522 on the outer surface 510 to a second position 524 also on the outer surface 510. The second portion 510b may extend counterclockwise from second position 524 to a third position 526 also on the outer surface 510. The third portion 510c may extend counterclockwise from third position 526 to first position 522. Again, in a similar manner to light pipe 400, the exterior protrusion 102 is configured on the first outer surface portion 510a to protrude externally away from the outer surface 510 such that reflective surface 108 functions as a secondary light source. More particularly, the reflective surface 108 is aligned with the inner surface 510. Those skilled in the art will recognize that the first, second and third portions 510a, 510b and 510c, respectively, are described with respect to the counterclockwise direction only for convenience and that reference to the clockwise direction is equally applicable.

Again, although the light pipe 500 has a generally circular cross-section, the first portion 510a of the outer surface 510 has a radius of curvature "R1" while second portion 510b has a radius of curvature "R2" which differs from the radius of curvature "R1". Furthermore, the third portion 510c has a radius of curvature "R3" which differs from the radius of curvature "R2" and from the radius of curvature "R1". The radius of curvature "R1" is less than the radius of curvature "R2" while the radius of curvature "R2" is less than the radius of curvature "R3". Alternatively, the radius of curvature "R3" is greater than the radius of curvature "R2" and the radius of curvature "R2" is greater than the radius of curvature "R1". The first position 522 forms a transition boundary between the first radius of curvature "R1" and the third radius of curvature "R3", while the second position 524 forms a transition boundary between the first radius of curvature "R1" and the second radius of curvature "R2". The third position 526 forms a transition boundary between the second radius of curvature "R2" and the third radius of curvature "R3".

In relation thereto, the outer surface 510 is configured such that when at least one of the one or more exterior protrusions, e.g., protrusion 102, functions as a secondary light source to direct light in the generally first direction, as indicated by the arrow "X" shown in FIG. 9, by emitting light from the reflective surface 108, the light pipe 500 is substantially asymmetrical with respect to the generally first direction "X".

The light pattern so emitted from the light pipe 500 results in an effective focal point "P3" occurring substantially offset from the reflective surface 108 and an effective partial angle of illumination "α3" is formed by the light pattern emitted from the second portion 510b. Simultaneously, the light pattern so emitted from the light pipe 500 results in the effective focal point "P2" occurring substantially at the reflective surface 108 and an effective partial angle of illumination "α4" is formed by the light pattern emitted from the third portion 510c. The effective partial angles of illumination "α3" and "α4" are adjacent to each other and form a total effective angle of illumination "α3" plus "α4" which is greater than the effective angle of illumination "α1" formed by the light pattern of the light pipe 100. The angles of illumination or light emission "α3" and "α4" are dependent upon the radii of curvature "R2" and "R3", respectively. The angles of illumination or light emission "α3" and "α4" are specified angles of light emission. When the one or more reflective surfaces 108 are illuminated, light is emitted from the light pipe 500 at one or more specified angles, e.g., angle of illumination or light emission "α3" and/or "α4".

The first portion 510a and/or the second portion 510b and/or the third portion 510c may extend at least partially along a length of the light pipe 500. The light pipe 500 is configured to provide a wide effective angle of illumination "α3" plus "α4" while simultaneously providing a substantially uniform distribution of light along the length "L" of the light pipe 400. Again, the reflective surface 108 of the protrusion 102 may be white in color.

Figure 10:
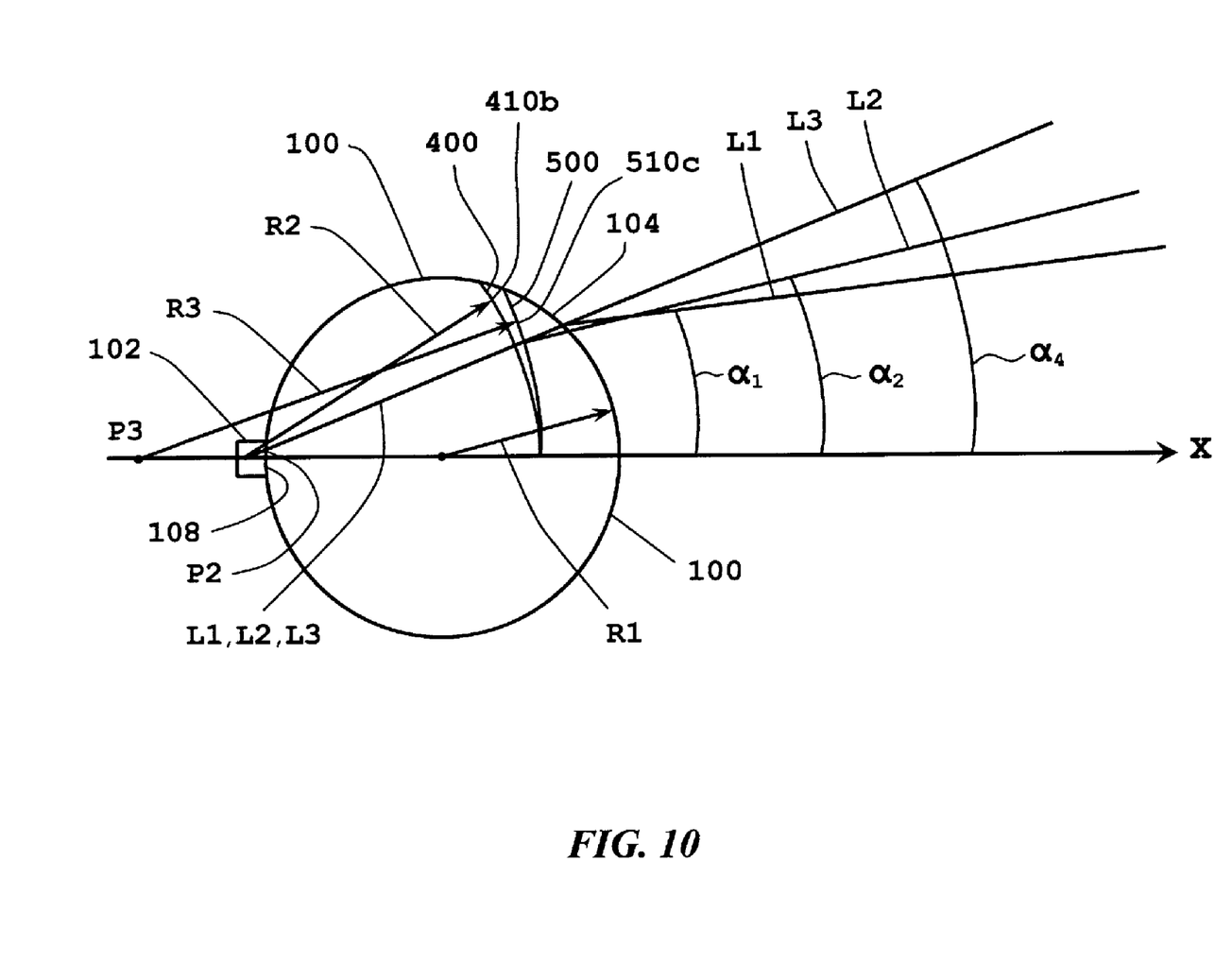
FIG. 10 is composite partial end view of the effective angle of illumination provided by the light pipes of FIGS. 8 and 9 in comparison to the effective angle of illumination of the prior art light pipe of FIG. 1.

FIG. 10 is composite partial end view of the effective angle of illumination provided by the light pipes of FIGS. 8 and 9 in comparison to the effective angle of illumination of the prior art light pipe of FIG. 1. More particularly, FIG. 10 illustrates the light pipe 100 on which is superimposed an upper portion of both light pipes 400 and 500. Light emitted from the reflective surface 108 travels in a direction to form a light path "L1" through the light pipe 100 where the light refracts at the outer surface 110 and continues in the light path "L1" to form the effective angle of illumination "α1".

In contrast, light emitted from the reflective surface 108 travels in a direction to form a light path "L2" through the light pipe 400 where the light refracts at the outer surface portion 410b and continues in the light path "L2" to form the effective angle of illumination "α2". The light path "L2" is substantially coincident with the light path "L1" through the respective light pipes 100 and 400.

Similarly, light emitted from the reflective surface 108 of the exterior protrusion 102 travels in a direction to form a light path "L3" through the light pipe 500 where the light refracts at the outer surface portion 510c and continues in the light path "L3" to form the effective angle of illumination "α4". The light path "L2" is substantially coincident with the light path "L1" through the respective light pipes 100 and 400.

For simplicity, the effective angle of illumination "α3" has been omitted. The light path "L3" is substantially coincident with the light paths "L1" and "L2" through the respective light pipes 500, 100 and 400. It can be seen that the effective angles of illumination "α2" and "α4" are each wider than the effective angle of illumination "α1". The light paths "L1", "L2" and "L3" are each shown as a line only as a representative ray. Light paths "L1", "L2" and "L3" all originate from the same point "P2" on surface 108. Light paths "L1", "L2" and "L3" are bent differently because they are refracted by the different curvatures of the light pipes 100, 400 and 500, respectively. Light paths L1, L2 and L3 are all the same until the outer surfaces 110, 410 and 510 of the light pipes 100, 400, 500 where the curvature is different. Since FIG. 10 is a super-imposed illustration of different configuration light pipes, the figure illustrates how light rays coming out in the same path eventually diverge in different directions.

As defined herein, a wide effective angle of illumination is an angle greater than or equal to 10 degrees and more particularly an angle ranging from about 10 degrees to about 50 degrees. Still more particularly, for the light pipes 200 and 300 illustrated in FIGS. 2-7, the angle "β1" is about 20 degrees while for the light pipe 400 illustrated in FIG. 8, the angle "α2" is about 30 degrees. For the light pipe 500 illustrated in FIG. 9, the sum of the angles "α3" and "α4" is about 35 degrees.

Embodiments of the present disclosure may be particularly suitable for automotive applications and for use with household appliances, although other applications are possible.

While the present disclosure has been described by illustrative embodiments, additional advantages and modifications will occur to those skilled in the art. Therefore, the invention in its broader aspects is not limited to specific details shown and described herein. Modifications, for example, to materials, configurations and sizes may be made without departing from the spirit and scope of the present disclosure. Accordingly, it is intended that the present disclosure not be limited to the specific illustrative embodiments, but be interpreted within the full spirit and scope of the appended claims and their equivalents.

What is claimed is:

1. A light pipe comprising:
    an elongated body extending along a longitudinal axis from a first end to a second end, the body being configured for total internal reflection of light from a light source at the first end, the body having an outer surface and an inner surface defining an interior region surrounding a center along the longitudinal axis, wherein, along a plane perpendicular to the longitudinal axis, the outer surface has a first portion that is curved and has a first radius of curvature measured from the center and a second portion that is curved and has a second radius of curvature which differs from the first radius of curvature, wherein light is emitted from the light pipe through the first portion of the body to the ambient environment and wherein light is emitted from the light pipe through the second portion to the ambient environment;
    at least one protrusion extending along the longitudinal axis of the body for substantially the length of the body, the protrusion extending at least one of inwardly and outwardly with respect to the outer surface, the protrusion being positioned along the first portion of the body generally opposite to the second portion; and
    one or more reflective surfaces facing the interior region and disposed such that when at least one of the one or more reflective surfaces is illuminated, light is emitted from the light pipe through the first and second portions to an ambient environment surrounding the outer surface at one or more specified angles of light emission to provide a wide effective angle of illumination while simultaneously providing a substantially uniform distribution of light along a length of the body.

2. The light pipe according to claim 1, wherein at least one of the one or more reflective surfaces are not aligned with the inner surface and are disposed such that when at least one of the one or more reflective surfaces is illuminated, light is emitted from the light pipe at one or more specified angles.

3. The light pipe according to claim 1, wherein the body defines a generally circular cross-section surrounding the center having a continuously curved outer surface extending entirely circumferentially around the center with the outer surface at the second portion being flatter than the outer surface at the first portion.

4. The light pipe according to claim 1, wherein the outer surface comprises a third portion having a third radius of curvature which differs from the second radius of curvature and from the first radius of curvature of the outer surface.

5. The light pipe according to claim 1, wherein the majority of the light emitted by the one or more reflective surfaces across the interior region toward the second portion is reflected by the inner surface of the second portion back into the interior region.

6. The light pipe according to claim 1, wherein the outer surface comprises a third portion having a constant, non-zero third radius of curvature which differs from the first radius of curvature and from the second radius of curvature, the one or more reflective surfaces emitting light across the interior region toward the second portion, wherein substantially all of the light emitted by the one or more reflective surfaces across the interior region toward the first and second portions is emitted through the first and second portions, respectively, to the ambient environment, and wherein substantially all of the light directed toward the third portion from the one or more reflective surfaces is reflected back into the interior region such that no light is emitted through the third portion to the ambient environment.

7. The light pipe according to claim 1, further comprising at least one protrusion extending along the longitudinal axis of the body, the protrusion extending at least one of inwardly and outwardly with respect to the outer surface, the one or more reflective surfaces being arranged on the protrusion.

8. The light pipe according to claim 1, wherein the one or more reflective surfaces comprises two or more reflective surfaces, and wherein one of the two or more reflective surfaces is substantially orthogonal to the other of the two or more reflective surfaces.

9. The light pipe according to claim 1, wherein the reflective surfaces are diametrically opposed to the first portion, the one or more reflective surfaces facing the interior region and emitting light across the center of the longitudinal axis toward the first portion.

10. A light pipe comprising:
   a light pipe body having an outer surface and an interior region bounded by an inner surface interfacing with the outer surface;
   one or more reflective surfaces aligned with the inner surface and disposed such that when at least one of the one or more reflective surfaces is illuminated, light is emitted from the light pipe at one or more specified angles of light emission;
   wherein the outer surface has a first portion, a second portion and at least a third portion thereof;
   wherein the one or more of the reflective surfaces functions as a secondary light source;
   wherein the second portion has a radius of curvature which differs from the radius of curvature of the first portion of the outer surface;
   wherein the third portion has a radius of curvature which differs from the radius of curvature of the second portion and from the radius of curvature of the first portion of the outer surface, the third portion having a constant, non-zero radius of curvature; and
   wherein the one or more reflective surfaces emitting light across the interior region toward the second portion, wherein substantially all of the light emitted by the one or more reflective surfaces across the interior region toward the first and second portions is emitted through the first and second portions, respectively, to the ambient environment, and wherein substantially all of the light directed toward the third portion from the one or more reflective surfaces is reflected back into the interior region such that no light is emitted through the third portion to the ambient environment.

11. The light pipe according to claim 10, wherein the radius of curvature of the at least a third portion of the outer surface is greater than the radius of curvature of the at least a second portion.

12. A light pipe comprising:
   a light pipe body having an outer surface and an interior region bounded by an inner surface interfacing with the outer surface and configured to provide a wide effective angle of illumination while simultaneously providing a substantially uniform distribution of light along a length of the light pipe, the body having a first portion and a second portion;
   at least one protrusion defining at least one channel disposed in the interior region and extending along a longitudinal axis of the body for substantially a length of the body, the channel forming two or more exposed surfaces in the interior region; the channel being positioned along the first portion of the body generally opposite to the second portion;
   two or more reflective surfaces not aligned with the inner surface disposed such that when at least one of the two or more reflective surfaces is illuminated, light is emitted from the light pipe at one or more specified angles;
   wherein at least one of the two or more reflective surfaces is disposed on at least one of the two or more exposed surfaces in the interior region; and
   wherein at least another one of the two or more reflective surfaces is disposed on at least another one of the two or more exposed surfaces
   such that the at least one of the two or more reflective surfaces disposed on at least one of the two or more exposed surfaces and the at least another one of the two or more reflective surfaces disposed on the at least another one of the two or more exposed surfaces are substantially orthogonal to each other.

13. The light pipe according to claim 12, wherein when at least one of the two or more reflective surfaces is illuminated, the at least one of the two or more reflective surfaces creates a secondary light source.

14. The light pipe according to claim 12, wherein one of the two or more reflective surfaces is substantially orthogonal to the other of the two or more reflective surfaces.

15. The light pipe according to claim 12, wherein the outer surface has a first portion and at least a second portion thereof; wherein the one or more of the reflective surfaces functions as a secondary light source, and
   wherein the at least second portion has a radius of curvature which differs from the radius of curvature of the first portion of the outer surface.

* * * * *